H. W. Mosher
Water Spout Cut Off
N° 69,359.  Patented Oct. 1, 1867.
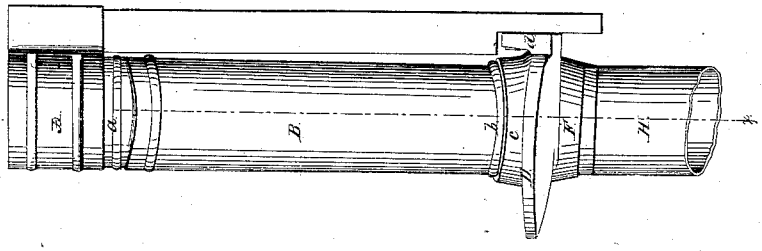
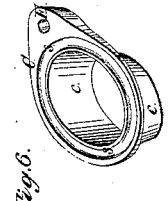
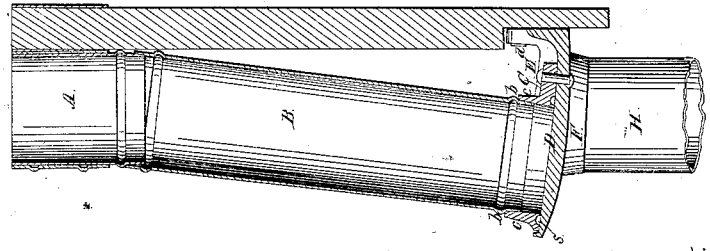
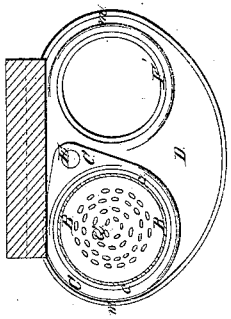
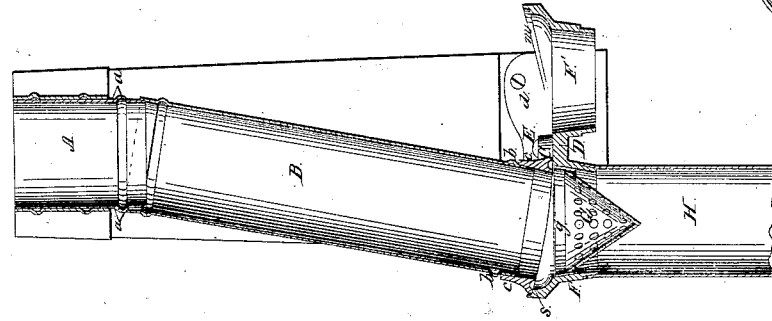
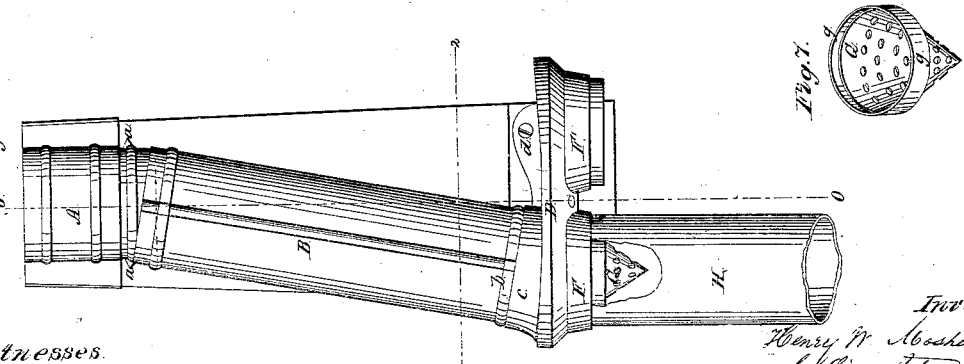
Witnesses:
A. O. H. Johnson
H. B. Munn
Inventor:
Henry W. Mosher
by his Attorney
Jno. Johnson

UNITED STATES PATENT OFFICE.

HENRY W. MOSHER, OF AURORA, ILLINOIS, ASSIGNOR TO HIMSELF AND EDWARD C. DUDLEY, OF SAME PLACE.

IMPROVEMENT IN CUT-OFFS FOR WATER-SPOUTS.

Specification forming part of Letters Patent No. 69,359, dated October 1, 1867.

*To all whom it may concern:*

Be it known that I, HENRY W. MOSHER, of Aurora, in the county of Kane and State of Illinois, have invented a certain new and useful improvement for changing the flow of water from one pipe to another, which I call a "Water Cut-Off;" and I do hereby declare the following to be a full, clear, and exact description of the same, reference being had to the annexed drawings, making part of this specification, and in which—

Figure 1 represents a front elevation of a cut-off containing my improvements. Fig. 2 represents a vertical section of the same at the line *x x* of Fig. 4. Fig. 3 represents a vertical section at the line *o o* of Fig. 1, showing the pivoted plate in the position it would occupy when placed between the openings in the base-plate. Fig. 4 represents a side elevation. Fig. 5 represents a horizontal section at the line 2 2 of Fig. 1. Fig. 6 represents a perspective view of the pivoted plate inverted to show the groove in the bottom thereof, and Fig. 7 represents a perspective view of the filter detached from the base-plate.

The object of this device is to change the course of the water for the supply of cisterns or other purposes from the cistern-pipe to a waste-pipe whenever it becomes necessary to do so to prevent the overflow of the cistern.

In the accompanying drawings, A represents a portion of the conducting-spout from the trough or eaves of the house or water-reservoir to which the shifting pipe B is connected. This shifting pipe is connected at its lower end to a horizontal cast-iron plate, C, which is pivoted to a cast-iron base-plate, D. This pivoted plate C is constructed with a circular flange or collar, *c*, into which the shifting pipe fits. It is pivoted at E to the base-plate D, in the middle of its length and near its inner edge, as shown in Figs. 3 and 5, so that it can be moved in the arc of a circle of which the pivot is the center from one end of said plate to the other. The base-plate D is secured to the side of the house or other place to which this cut-off may apply by means of a flange, *d*, and its front edge is circular, the center of which circle is the pivot E, while its ends are also circular, corresponding with the circle of the flange *c* of the pivoted plate. The upper face of this plate D is concave in the direction of its length, corresponding to a circle whose center is the upper end of the shifting pipe; and it is also slightly inclined upward from its place of attachment and curved transversely, in order that the adjacent surfaces of the pivoted plate C and the face of the base-plate may fit properly together and allow the pivoted plate C to be turned from one side to the other without binding. This base-plate is provided with two circular openings, one on each side of the center of its length, from which project collars or flanges F F', to either of which the cistern-pipe may be secured, according to the position of the corner of the building to which the conducting-spout is attached—that is to say, it is applicable to either the right or left corner of the building, while the opening to which the cistern-pipe is not attached forms the escape.

It will be observed that the upper edges of these openings are on the same horizontal plane as shown in Fig. 2, while the pivoted plate C may be moved from one to the other in the arc of a circle. Each end of the flanged base-plate is therefore elevated, as shown in Fig. 2, in consonance with the curve described by the pivoted plate C, so as to form a seat, *m*, for said plate over each opening.

The shifting pipe, connected as described, although fixed at either end, does not admit of an inflexible motion, but must be so connected as to admit of a sort of swivel motion at each end. Therefore the end fitting into the pivoted plate C is provided with a bead, *b*, or other suitable stop, while the upper end fits loosely over the conducting-spout A and is held in place by two projecting snugs, *a a*, secured to the conducting-spout A diametrically opposite each other. By these stops the shifting spout is permitted to have a slight axial motion at each end, in order to allow it to be changed from the cistern to the escape-opening without binding and maintain its proper connection at each end. This is effected by the stop at each end, because the shifting pipe would either descend too far into the pivoted plate were it not for the bead *b*, or become separated therefrom were it not for the projecting snugs *a a* on the fixed spout.

To prevent the water from dripping upon and spreading over the base-plate, I form a deep groove, s, in the bottom of the pivoted plate, concentric with the opening therein, as shown in Fig. 6, so that when the pivoted plate is adjusted over the opening in the base-plate the inner edge of said groove will be within said opening, while the outer edge of the groove only rests upon the base-plate, as shown in Fig. 2, so that the water must drip from the inner edge of the groove into the pipe below, and is thereby prevented from dripping on the base-plate, where it would be liable to freeze round the joints of the two plates. The openings in the base-plate must be of greater diameter than the opening in the pivoted plate by at least half the width of the groove.

A filter or strainer, G, may be placed in the opening to which the cistern-spout H is connected, as shown in Figs. 1 and 2, for the purpose of arresting the impurities flowing with the water from the roof of the house. This filter or strainer is placed in the opening of the base-plate so as to be flush with the top thereof, as shown in Fig. 2. It is of a conical form form and perforated with holes of suitable size, and it is held in place by means of a circular band, g, secured to its upper edge, as shown in Fig. 7, which fits into the opening of the base-plate so that its upper edge is flush, or nearly so, with the top of the opening, the sides of which are inclined slightly inward in order to form a seat for said band g. By this arrangement and construction the filter is easily removed from its seat when desired, and replaced in a moment. To remove the filter, the pivoted plate must be turned to the other side over the waste-pipe. Then place two fingers within the filter and the thumb under the flanged base-plate, and closing the hand with pressure, the filter will readily come out, and can be as readily put back in its seat after being cleaned.

Having thus described my improvements, I claim—

1. The shifting pipe B and the flange or collar c of the horizontal pivoted plate C, arranged in relation to the conducting-spout A in such manner that the lower end of the shifting pipe may be moved horizontally in the arc of a circle, substantially as described.

2. The combination of the fixed base-plate D, having two openings, with the horizontal pivoted plate C, which carries the shifting pipe, when constructed and arranged so that the surfaces of these two plates shall remain in contact while changing the pivoted plate from the cistern-pipe to the escape-opening, and vice versa, substantially as described.

3. The shifting pipe B, sustained so that it will maintain its proper connection with the conducting-spout A and the pivoted flanged plate C by means of an annular seat, b, on the lower end thereof, and the fixed ears or projections a a on the fixed conducting-spout, as herein described.

4. The pivoted flanged plate C, provided with an annular groove, s, in the bottom thereof, in such manner as to maintain the relation with the influx-opening of the base-plate, as herein described, and for the purpose set forth.

5. The filter G, seated in the influx-opening of the base-plate D, the shifting pipe B, and the pivoted plate C, all arranged substantially as herein described.

In testimony whereof I have hereunto signed my name.

HENRY W. MOSHER.

Witnesses:
F. STRINGER,
W. S. ALLEN.